(12) United States Patent
Ross et al.

(10) Patent No.: US 8,490,586 B2
(45) Date of Patent: Jul. 23, 2013

(54) ELECTROMAGNETIC ACTUATING UNIT OF A SOLENOID VALVE, AND METHOD FOR THE PRODUCTION OF SUCH AN ACTUATING UNIT

(75) Inventors: Christoph Ross, Bamberg (DE); Josef Groeschel, Goessweinstein (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 525 days.

(21) Appl. No.: 12/743,088

(22) PCT Filed: Nov. 4, 2008

(86) PCT No.: PCT/EP2008/064937
§ 371 (c)(1),
(2), (4) Date: May 14, 2010

(87) PCT Pub. No.: WO2009/062864
PCT Pub. Date: May 22, 2009

(65) Prior Publication Data
US 2010/0244589 A1 Sep. 30, 2010

(30) Foreign Application Priority Data
Nov. 16, 2007 (DE) .......................... 10 2007 054 652

(51) Int. Cl.
*F01L 9/04* (2006.01)

(52) U.S. Cl.
USPC ................ 123/90.11; 123/90.15; 251/129.01; 251/129.15

(58) Field of Classification Search
USPC ............ 123/90.11, 90.15, 90.17; 251/129.01, 251/129.15
See application file for complete search history.

(56) References Cited

U.S. PATENT DOCUMENTS

| | | | |
|---|---|---|---|
| 5,090,364 A * | 2/1992 | McCarroll et al. | 123/90.16 |
| 5,779,220 A | 7/1998 | Nehl | |
| 6,615,780 B1 | 9/2003 | Lin et al. | |
| 7,124,722 B2 * | 10/2006 | Smith | 123/90.17 |
| 7,564,332 B2 * | 7/2009 | Telep | 335/255 |
| 2006/0017535 A1 | 1/2006 | Nagasaki | |

FOREIGN PATENT DOCUMENTS

| | | |
|---|---|---|
| DE | 31 16 402 A | 11/1982 |
| DE | 102 11 467 | 9/2003 |
| DE | 10 2005 048 732 | 4/2007 |
| WO | 2006051859 A | 5/2006 |

* cited by examiner

*Primary Examiner* — Ching Chang
(74) *Attorney, Agent, or Firm* — Lucas & Mercanti, LLP

(57) ABSTRACT

An electromagnetic actuating unit of a hydraulic control valve which has an armature disposed inside an armature chamber in an axially displaceable manner, and a pole core disposed in a recess. The pole core limits the armature chamber in a direction of movement of the armature. The geometry of the armature serves to adjust the characteristic line of the electromagnetic actuating unit.

13 Claims, 2 Drawing Sheets

1

ELECTROMAGNETIC ACTUATING UNIT OF A SOLENOID VALVE, AND METHOD FOR THE PRODUCTION OF SUCH AN ACTUATING UNIT

This application is a 371 of PCT/EP2008/064937 filed Nov. 4, 2008, which in turn claims the priority of DE 10 2007 054 652.3 filed Nov. 16, 2007, the priority of both applications is hereby claimed and both applications are incorporated by reference herein.

FIELD OF THE INVENTION

The invention relates to an electromagnetic actuating unit of a solenoid valve, in particular a hydraulic directional valve having an armature, which is arranged within an armature space in an axially displaceable manner, and a pole core which is arranged in a receptacle and delimits the armature space in one direction of movement of the armature.

Directional valves of this type are used, for example, in internal combustion engines for actuating hydraulic camshaft adjusters. Hydraulic camshaft adjusters are described sufficiently well in the prior art, and therefore detailed explanation of camshaft adjusters can be dispensed with here. Directional valves comprise an electromagnetic actuating unit and a valve portion. The valve portion constitutes the hydraulic portion of the directional valve, with at least one inflow connection, at least one working connection and a tank connection being formed on this portion. By means of the electromagnetic actuating unit, specific connections of the valve portion can be hydraulically connected to one another and the pressure-medium flows can therefore be directed.

For use of a directional valve for controlling a camshaft adjuster, said directional valve is generally in the form of a 4/3 or 4/2 proportional directional valve. A camshaft adjuster with a 4/2 proportional directional valve is known, for example, from DE 102 11 467 A1.

DE 10 2005 048 732 A1 describes an electromagnetic actuating unit of a hydraulic directional valve having an armature, which is arranged within an armature space in an axially displaceable manner, and a pole core. The electromagnetic actuating unit comprises at least one outflow channel which communicates both with the armature space and also with the exterior of the actuating unit. Engine oil in the armature space can be conducted out of the actuating unit via the outflow channel, as a result of which a rinsing action can be achieved within the armature space.

A primary requirement in proportional valve solenoids is to adapt the characteristic curve of the magnet to the respectively existing boundary conditions. In order to permit precise control of the throughflow rates and throughflow times in the valve portion, the characteristic curve of the electromagnetic actuating unit should have as constant as possible a profile of the magnetic force over the entire valve stroke. In the prior art, the characteristic curve is adapted to this desired profile by modifying the geometry of the pole core. To this end, it is necessary for the pole core, which is usually produced by shaping, to be subjected to cost-intensive additional processing.

The object of the present invention is therefore to provide an electromagnetic actuating unit in which no additional processing of the pole core is required to adapt the characteristic curve of the actuating unit. Instead, it should be possible to adapt the characteristic curve by constructive measures which are simpler to execute. Despite the desired adaptation of the characteristic curve, the electromagnetic actuating unit should be cost-effective to produce.

The object according to the invention is achieved by an electromagnetic actuating unit as claimed in appended claim 1 and also a method for the production of an electromagnetic actuating unit as claimed in appended claim 11. The electromagnetic actuating unit according to the invention is distinguished in that the geometry of the armature is changed in terms of design in order to adapt the characteristic curve of the magnetic actuating unit.

Influencing the characteristic curve by means of the geometry of the armature, as realized in the solution according to the invention, is very advantageous. Since the armature is produced by cutting machining, generally by turning, for example by means of CNC machines, in any case, the respectively required geometric modification can be integrated in the CNC program which is to be implemented during production of the armature. This does not lead to any significant increase in the processing time. Cost-intensive post-processing of the pole core, which has been required to date, can be dispensed with. Therefore, the pole core can be produced completely by shaping, this resulting in an immense saving in time and cost compared to conventional production processes for adapting characteristic curves.

The geometry of the armature, which geometry is adapted to the respective intended use of the actuating unit, first has to be calculated. A person skilled in the art is aware of the calculation models by means of which the dependency of the characteristic curve profile of the electromagnetic actuating unit can be represented by the geometry of the components which conduct the magnetic flux. Instead of changing the shape of the pole core, as has been customary to date, the pole core shape is, according to the invention, now selected such that the pole core is no longer subjected to cutting post-machining after being produced by shaping, and instead the geometry of the armature is adapted.

In one advantageous embodiment, the armature has an encircling sawtooth-like recess at its end which faces the pole core. Other embodiments use an armature which is provided with an encircling V-shaped recess at its end which faces the pole core. An armature which has an encircling recess in the form of an arc of a circle at its end which faces the pole core has also proven advantageous. However, the invention is not restricted to said embodiments of the armature. Other refinements of the armature are entirely feasible. The geometry which is adapted compared to the conventional armature shape for the purpose of influencing the characteristic curve can be produced in a regular manner by cutting machining. However, in modified embodiments, it is also possible to produce the armature by shaping.

According to a particularly preferred embodiment, the electromagnetic actuating unit serves to control a hydraulic directional valve of a camshaft adjuster for internal combustion engines. In other advantageous embodiments, the electromagnetic actuating unit may also serve to control switchable valve clearance compensation elements in internal combustion engines. Such switchable valve compensation elements are, for example, switchable bucket tappets, switchable roller tappets or switchable cam followers. In this case, it has proven advantageous if the electromagnetic actuating unit is arranged on the cylinder head of the internal combustion engine.

The electromagnetic actuating unit can preferably serve to control a 4/3-, 4/2- or 3/2-way valve. It is also advantageous if the electromagnetic actuating unit is in the form of a proportional valve solenoid and serves to control a proportional directional valve.

Further advantages, details and developments of the present invention can be gathered from the following description of preferred embodiments, with reference to the drawing, in which:

FIG. 1 shows a longitudinal sectional illustration of a hydraulic 4/3-way valve with an electromagnetic actuating unit according to the invention. A preferred application of this directional valve is in regulating the position of a hydraulic camshaft adjuster.

Figure 1:
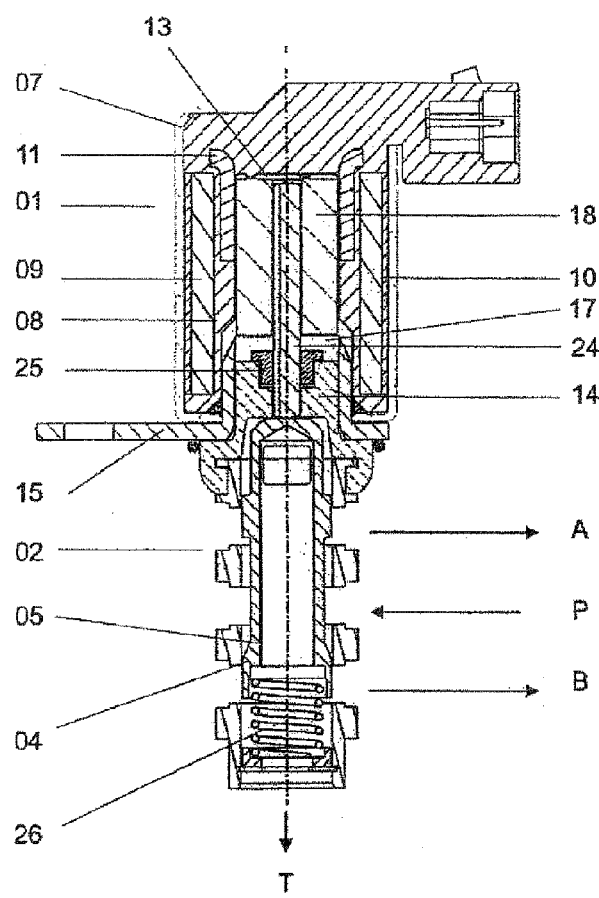
FIG. 1 shows a longitudinal sectional illustration of a hydraulic 4/3-way valve with an electromagnetic actuating unit according to the invention.

The hydraulic directional valve comprises an electromagnetic actuating unit 01 and a valve portion 02. The valve portion 02 is made up of a valve housing 04 and a control piston 05. The valve housing 04 has an inflow connection P, two working connections A and B, and an outflow connection T. The control piston 05 is arranged within the valve housing 04 in an axially displaceable manner. Each of the working connections A, B can be connected either to the inflow connection P or to the outflow connection T by suitable positioning of the control piston 05 relative to the valve housing 04. The working connections A, B are hydraulically connected to pressure chambers of the camshaft adjuster (not illustrated) via pressure-medium lines (not illustrated). By corresponding positioning of the control piston 05 within the valve housing 04, pressure medium can be selectively supplied to or discharged from individual pressure chambers of the camshaft adjuster, and therefore the phase angle of the camshaft relative to the crankshaft can be set.

The electromagnetic actuating unit 01 is arranged offset in relation to the valve portion 02 in the axial direction. The electromagnetic actuating unit 01 used is preferably a proportional valve solenoid. The electromagnetic actuating unit 01 has a coil former 08 which is arranged within a housing 07. The coil former 08 carries a coil 09 which comprises a plurality of turns of a wire and is at least partially surrounded by a coil encapsulation 10 comprising non-magnetic material. A magnet yoke 11 is arranged on the coil former 08. An armature guide tube 13 extends in the radial direction toward the magnet yoke 11. The electromagnetic actuating unit 02 also has a pole core 14 which is attached to the housing 07 by means of a holder 15.

The armature guide tube 13 and the pole core 14 delimit an armature space 17 in which an axially displaceable armature 18 is arranged. The characteristic curve of the electromagnetic actuating unit 01 can be adapted to the respective requirements by modifying the geometry of the armature 18. The geometry of the armature 18 which is required for the specific application has to be calculated. The option of influencing the characteristic curve is of great importance primarily in electromagnetic actuating units 01 which use a proportional valve solenoid. In this case, it is necessary to ensure that the characteristic curve has as linear and continuous a profile as possible over the entire valve stroke.

Figures 2, 3, 4:
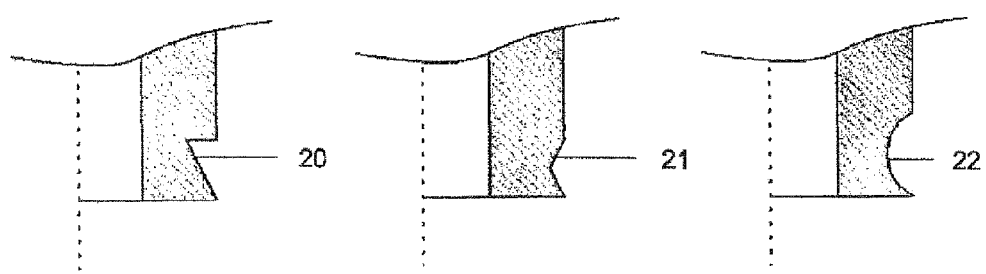
FIG. 2 shows a partial view of a first embodiment of an armature which is used in the electromagnetic actuating unit according to the invention.
FIG. 3 shows a partial view of a second embodiment of an armature which is used in the electromagnetic actuating unit according to the invention.
FIG. 4 shows a partial view of a third embodiment of an armature which is used in the electromagnetic actuating unit according to the invention.

Examples of various embodiments of the armature 18 can be gathered from FIGS. 2, 3 and 4. In the embodiment shown in FIG. 2, the armature 18 has an encircling sawtooth-like recess 20 at its end which faces the pole core 14. The embodiment illustrated in FIG. 3 is distinguished in that the armature has an encircling V-shaped recess 21 at its end which faces the pole core 14. In the embodiment shown in FIG. 4, the armature 18 is provided with an encircling recess 22 in the form of an arc of a circle at its end which faces the pole core 14. The geometric modifications required to adapt the armature geometry to the respective requirements can be integrated in the CNC program used to produce the armature, and therefore no additional processing steps are required.

A tappet pushrod 24 is connected to the armature 18. The tappet pushrod 24 extends through an opening which is formed in the pole core 14. One end of the tappet pushrod 24 rests against the control piston 05 of the valve portion 02. A sliding bearing 25 can be provided within the opening in order to minimize frictional losses at this point.

During operation of the internal combustion engine, a magnetic field is generated within the electromagnetic actuating unit 01 by current being applied to the coil 09. In this case, the pole core 14, the housing 07, the magnet yoke 11 and the armature 18 serve as a flow path which is completed by an air gap between the armature 18 and the pole core 14. In this case, a magnetic force acts on the armature 18 in the direction of the pole core 14, said magnetic force being dependent on the application of current to the coil 09. By balancing the magnetic force, which acts on the armature 18, and the spring force, which acts on the control piston 05 by way of a spring 26, the armature 18 and therefore the control piston 05 can be positioned in any desired position between two end positions.

Figure 5:
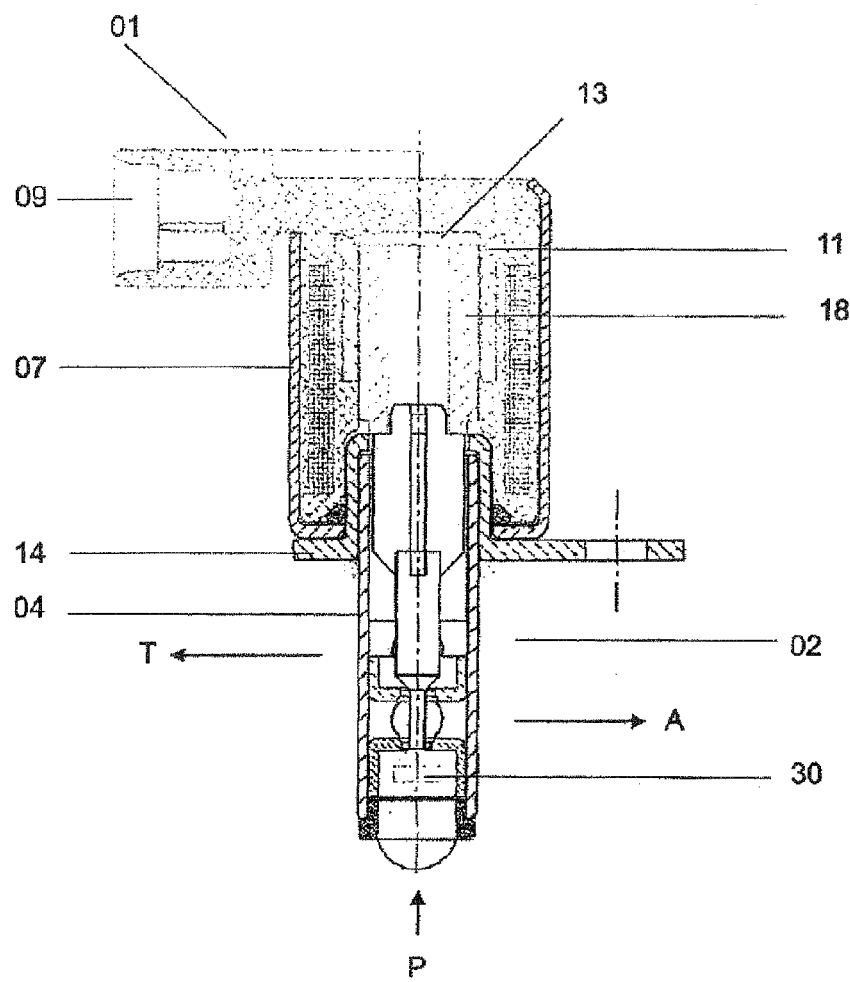
FIG. 5 shows a longitudinal sectional illustration of a hydraulic 3/2-way valve with the electromagnetic actuating unit according to the invention.

FIG. 5 shows a longitudinal sectional illustration of a hydraulic 3/2-way valve with the electromagnetic actuating unit according to the invention. The 3/2-way valve is preferably used to control switchable valve clearance compensation elements, for example switchable bucket tappets, switchable roller tappets or switchable cam followers.

The hydraulic 3/2-way valve again comprises the electromagnetic actuating unit 01 and the valve portion 02. The valve portion 02 comprises the valve housing 04. A normally open contact 29 and a sealing body 30 are arranged within the valve housing. The valve housing 04 has an inflow connection P, a working connection A, and an outflow connection T. The working connection A is hydraulically connected to the valve clearance compensation element (not illustrated), which is to be switched, by means of a pressure-medium line (not illustrated).

The electromagnetic actuating unit 01 is arranged offset in relation to the valve portion 02 in the axial direction. The electromagnetic actuating unit 01 used is preferably a proportional valve solenoid. The electromagnetic actuating unit 01 again comprises the housing 07, the coil 09 and the magnet yoke 11. The armature guide tube 13 extends in the radial direction toward the magnet yoke 11. The electromagnetic actuating unit 01 also has the pole core 14, which is attached to the housing 07, and the armature 18.

As already described in relation to FIG. 1, the geometry of the armature 18 can also be modified in this embodiment in order to thus adapt the characteristic curve of the electromagnetic actuating unit 01 to the respective requirements. The armature 18 is connected to the normally open contact 29 of the valve portion 02. During operation, there are only two valve states, specifically "open" and "closed". This means that either full pressure is applied or no pressure at all is applied.

LIST OF REFERENCE SYMBOLS

01 Electromagnetic actuating unit
02 Valve portion
03 -
04 Valve housing
05 Control piston
06 -
07 Housing
08 Coil former
09 Coil
10 Coil encapsulation
11 Magnet yoke
12 -
13 Armature guide tube
14 Pole core
15 Receptacle
17 Armature space
18 Armature
20 Sawtooth-like recess
21 V-shaped recess
22 Recess in the form of an arc of a circle
24 Tappet pushrod
25 Sliding bearing
26 Spring
29 Normally open contact
30 Sealing body
A, B Working connections
P Inflow connection
T Outflow connection

The invention claimed is:

1. An electromagnetic actuating unit of a solenoid valve, comprising:
   an armature, which is arranged within an armature space in an axially displaceable manner; and
   a pole core which bounds the armature space in one direction of movement of the armature,
   wherein a geometry of the armature is selected in such a way that nonlinearities in a force/displacement characteristic curve of the electromagnetic actuating unit are reduced as a result, the armature having an encircling recess forming a groove in an outer circumferential surface of the armature at an end which faces the pole core.

2. The electromagnetic actuating unit of claim 1, wherein the encircling recess of the armature is an encircling sawtooth-shaped recess at an end which faces the pole core.

3. The electromagnetic actuating unit of claim 1, wherein the encircling recess of the armature is an encircling V-shaped recess at an end which faces the pole core.

4. The electromagnetic actuating unit of claim 1, wherein the encircling recess of the armature is an encircling recess in the form of an arc of a circle at an end which faces the pole core.

5. The electromagnetic actuating unit of claim 1, wherein the electromagnetic actuating unit is part of a hydraulic directional valve.

6. The electromagnetic actuating unit of claim 5, wherein the electromagnetic actuating unit is arranged on a cylinder head of an internal combustion engine.

7. The electromagnetic actuating unit of claim 5, wherein the hydraulic directional valve is a camshaft adjuster for internal combustion engines.

8. The electromagnetic actuating unit of claim 1, wherein the electromagnetic actuating unit is part of a solenoid valve for controlling switchable valve clearance compensation elements in internal combustion engines.

9. The electromagnetic actuating unit of claim 8, wherein the switchable valve clearance compensation elements are switchable bucket tappets, switchable roller tappets or switchable cam followers.

10. The electromagnetic actuating unit of claim 1, wherein the electromagnetic actuating unit is part of a 4/3-way valve, 412-way valve or 3/2-way valve.

11. The electromagnetic actuating unit of claim 1, wherein the electromagnetic actuating unit comprises a proportional valve solenoid, and in that the proportional valve solenoid is part of a proportional directional valve.

12. The electromagnetic actuating unit of claim 1, wherein the pole core is arranged in a holder.

13. A method for the production of an electromagnetic actuating unit of a hydraulic directional valve having an armature, which is arranged within an armature space in an axially displaceable manner, and a pole core which bounds the armature space in one direction of movement of the armature, comprising the following steps:
   defining a desired force/displacement characteristic curve of the electromagnetic actuating unit;
   determining a geometry of the armature which, in connection with the other magnetically active components of the actuating unit, leads to the defined characteristic curve, the geometry including an encircling recess forming a groove in an outer circumferential surface of the armature at an end which faces the pole core;
   production of the armature with the geometry determined above;
   assembly of the electromagnetic actuating unit.

* * * * *

UNITED STATES PATENT AND TRADEMARK OFFICE
CERTIFICATE OF CORRECTION

PATENT NO.        : 8,490,586 B2  
APPLICATION NO.   : 12/743088  
DATED             : July 23, 2013  
INVENTOR(S)       : Ross et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 524 days.

Signed and Sealed this
Eighth Day of September, 2015

Michelle K. Lee
*Director of the United States Patent and Trademark Office*